United States Patent [19]
Harris et al.

[11] Patent Number: 5,994,489
[45] Date of Patent: Nov. 30, 1999

[54] ADHESION PROMOTER AND SELF-PRIMING ARYLCYCLOBUTENE RESIN COMPOSITIONS

[75] Inventors: Robert F. Harris; Paul H. Townsend, III, both of Midland, Mich.

[73] Assignee: The Dow Chemical Company, Midland, Mich.

[21] Appl. No.: 08/327,954

[22] Filed: Oct. 24, 1994

[51] Int. Cl.$^6$ .................................................. C08G 77/06
[52] U.S. Cl. ................................ 528/12; 528/23; 528/32; 528/41; 528/43; 556/463; 556/470; 556/482
[58] Field of Search .................................... 556/463, 470, 556/482; 528/32, 41, 43, 12, 23

[56] References Cited

U.S. PATENT DOCUMENTS

| | | | |
|---|---|---|---|
| 3,350,345 | 10/1967 | Vanderbilt et al. ........................ | 260/41.5 |
| 4,540,763 | 9/1985 | Kirchhoff ................................. | 526/281 |
| 4,642,329 | 2/1987 | Kirchhoff et al. ....................... | 526/284 |
| 4,687,823 | 8/1987 | Kirchhoff et al. ....................... | 526/284 |
| 4,730,030 | 3/1988 | Hahn et al. .............................. | 526/262 |
| 4,732,858 | 3/1988 | Brewer et al. ........................... | 437/228 |
| 4,759,874 | 7/1988 | Gros . | |
| 4,783,514 | 11/1988 | Kirchhoff et al. ....................... | 526/281 |
| 4,812,588 | 3/1989 | Schrock ................................... | 556/453 |
| 4,826,997 | 5/1989 | Kirchhoff ................................. | 548/546 |
| 4,831,172 | 5/1989 | Hahn et al. . | |
| 4,950,583 | 8/1990 | Brewer et al. ........................... | 430/311 |
| 4,973,636 | 11/1990 | Corley ...................................... | 526/262 |
| 4,999,449 | 3/1991 | Kirchhoff ................................. | 560/8 |
| 5,002,808 | 3/1991 | Hahn et al. . | |
| 5,025,080 | 6/1991 | Wong ....................................... | 528/170 |
| 5,185,391 | 2/1993 | Stokich .................................... | 524/87 |
| 5,416,233 | 5/1995 | DeVries . | |

FOREIGN PATENT DOCUMENTS

WO93/12055   6/1993   WIPO .

OTHER PUBLICATIONS

Heistand II, R., et al., Cyclotene* 3022 (BCB) for Non-–Hermetic Packaging, pp. 585–590, ISHM '92 Proceedings.

Townsend, P.H., et al., Mat. Res. Symp. Proc., vol. 323., Materials Research Society (1994).

Improving the Adhesion of Benzocyclobutene Resins to Various Substrates, Research Disclosure, 873, (1991).

Plueddemann, E.P., Silane Coupling Agents, pp. 49–64, Plenum Press, NY and London.

Walker, P., J. Adhesion Sci. Technol., vol. 5, No. 4, pp. 279–305 (1991).

Gentle, T.E., J. Adhesion Sci. Technol., vol. 6, No. 2, pp. 307–316 (1992).

*Primary Examiner*—Melvyn I. Marquis

[57] ABSTRACT

A method of hydrolyzing an alkoxysilane which comprises adding sufficient water to hydrolyze at least one alkoxy group, optionally, in the presence of acidic or basic catalysts.

6 Claims, No Drawings

ADHESION PROMOTER AND SELF-PRIMING ARYLCYCLOBUTENE RESIN COMPOSITIONS

BACKGROUND OF THE INVENTION

The present invention relates to a coating composition and more particularly to a solution of a hydrolyzed or partially hydrolyzed alkoxysilane, and an arylcyclobutene resin, and to a solventless process for preparing hydrolyzed or partially hydrolyzed alkoxysilanes.

It is known to use hydrolyzed alkoxysilanes as adhesion promoters or coupling agents for various polymeric materials. The hydrolyzed alkoxysilanes are typically used as a primer layer, i.e., they are applied to the substrate first, followed by application of the polymeric material. The alkoxysilanes are typically hydrolyzed to form aqueous and/or protic solutions before being applied as thin films. However, most organoalkoxy-silanes are not soluble in water and must be dissolved first in a compatible organic solvent, such as an alcohol. Unfortunately, upon application of the aqueous alkoxysilane/alcohol mixture, a discontinuous film forms which contains voids where the film has not covered the substrate.

It is also known that a hydrolyzed alkoxysilane can be used as an adhesion promoter primer layer for arylcyclobutene resins. For example, in Proc. MRS, Vol. 323, pg. 365, 1994, *Adhesion of Cyclotene™ (BCB) Coatings on Silicon Substrates*, a prehydrolyzed solution of 3-methacryloxypropyltrimethoxysilane (MOPS) in methanol was used as an adhesion promoter for Cyclotene™. However, the MOPS solution is extremely difficult to deposit uniformly, forming agglomerates on the surface, which leads to reliability problems when used in fabricated parts.

It is also known to hydrolyze specific silanes in the absence of a solvent. U.S. Pat. No. 3,350,345 to Vanderbilt et al. describes a process of hydrolyzing specific silanes by adding water to hydrolyze at least one but not all of the alkoxy groups. The specific silanes have reactive groups such as amino, mercapto, carboxyl or cyano, which self-catalyze the hydrolysis process.

Accordingly, it remains highly desirable to provide coating compositions containing an arylcylcobutene which does not exhibit the foregoing disadvantages as well as to provide a process which does not use an organic solvent for hydrolyzing alkoxysilanes.

SUMMARY OF THE INVENTION

One aspect of the present invention is a coating composition comprising:
 a) a hydrolyzed or partially hydrolyzed alkoxysilane,
 b) a solvent, and
 c) an arylcyclobutene.

In a preferred embodiment, the coating composition comprises:
 a) a hydrolyzed or partially hydrolyzed alkoxysilane of the formula:

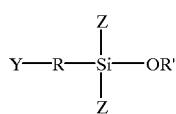

(I)

wherein R is $C_1-C_6$ alkylidene, $C_1-C_6$ alkylene, arylene, or a direct bond; Y is $C_1-C_6$ alkyl, $C_2-C_6$ alkenyl, aryl, 3-methacryloxy, 3-acryloxy, 3-aminoethyl-amino, or 3-amino; R' is independently in each occurrence $C_1-C_6$ alkyl; and Z is $C_1-C_6$ alkyl, $C_2-C_6$ alkenyl or OR';
 b) a solvent, and
 c) an arylcyclobutene.

In a most preferred embodiment, the coating composition comprises a partially hydrolyzed 3-methacryloxypropyltrimethoxysilane, mesitylene, and a bisbenzocyclobutene.

In another aspect, the present invention is a method of hydrolyzing an alkoxysilane which comprises adding sufficient water to hydrolyze at least one alkoxy group, optionally, in the presence of acidic or basic catalysts.

In a preferred embodiment, 3-methacryloxypropyltrimethoxysilane is partially hydrolyzed in the presence of hydrochloric acid.

The coating compositions of the present invention are useful in a variety of applications, including coatings for multichip modules, flat panel displays and integrated circuits.

DETAILED DESCRIPTION OF THE INVENTION

The alkoxysilanes which can be employed in the coating composition of the present invention can be any alkoxysilane or mixture thereof which are capable of forming a solution with the arylcyclobutene components in an organic liquid. Preferably, the alkoxysilanes are dialkoxy or trialkoxysilanes. More preferably, the alkoxysilanes correspond to the formula:

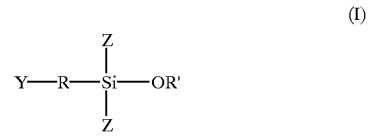

(I)

wherein R is $C_1-C_6$ alkylidene, $C_1-C_6$ alkylene, arylene, or a direct bond; Y is $C_1-C_6$ alkyl, $C_2-C_6$ alkenyl, aryl, 3-methacryloxy, 3-acryloxy, 3-aminoethylamino, or 3-amino; R' is independently in each occurrence $C_1-C_6$ alkyl; and Z is $C_1-C_6$ alkyl, $C_2-C_6$ alkenyl or OR'.

The term alkylidene refers to aliphatic hydrocarbon radicals wherein attachment occurs on the same carbon. The term alkylene refers to radicals which correspond to the formula $-(C_nH_{2n})-$. The term aryl refers to an aromatic radical, aromatic being defined as containing $(4n+2)_\pi$ electrons as described in Morrison and Boyd, *Organic Chemistry*, 3rd ed., 1973. The term arylene refers to an aryl radical having two points of attachment. The term alkyl refers to saturated aliphatic groups such as methyl, ethyl, etc. Alkenyl refers to alkyl groups containing at least one double bond, such as ethylene, butylene, etc. The groups previously described may also contain other substituents, such as halogens, alkyl groups, aryl groups, and hetero groups such as ethers, esters, amides; or acidic or basic moieties, i.e. carboxylic, epoxy, amino, sulfonic, or mercapto, provided the alkoxysilane remains compatible with the other components of the coating composition.

Preferably the alkoxysilane is a trialkoxysilane such as 3-methacryloxypropyltrialkoxysilane, 3-aminopropyltrialkoxysilane, a vinyltrialkoxysilane, a benzyltrialkoxysilane, a bicycloheptenyltrialkoxysilane, a cyclohexenylethyltrialkoxysilane, a cyclohexyltrialkoxysilane, a cyclopentadienylpropyltrialkoxysilane, a 7-octa-1- enyltrialkoxysilane, a phenethyltrialkoxysilane or an allyltrialkoxysilane. The alkoxysilane is most preferably 3-methacryloxypropyltrimethoxysilane.

The alkoxysilanes are preferably hydrolyzed or partially hydrolyzed by the solventless process described hereinafter and can be used directly in the coating compositions. Alternatively, the hydrolyzed or partially hydrolyzed alkoxysilane can be prepared in a volatile solvent. In such case, the solvent must be removed prior to being incorporated into the coating composition of the present invention.

The alkoxysilanes useful in the practice of the present invention can be made by techniques well known in the art such as exemplified in *Encyclopedia of Chemical Technology,* Third Edition, Volume 20, pgs., 916–918, 1982 and *Silane Coupling Agents* by Edwin P. Plueddemann, Chapter 2, pgs. 30–31, 1982.

The solvent used in the film forming coating composition of the present invention can be any organic liquid or mixture of two or more organic liquids in which the adhesion promoter and the arylcyclobutene are soluble to produce a film forming composition. The solvent is preferably an aprotic solvent or one which is highly immiscible with water. Representative examples of solvents include aromatic hydrocarbons, ketones, esters, ethers or mixtures thereof. Preferably, the solvent is an aromatic hydrocarbon, more preferably toluene, xylene, mesitylene or an alkylnaphthalene and most preferably mesitylene.

The arylcyclobutene used in the film forming coating compositions can be any arylcyclobutene which is capable of forming a solution with the hydrolyzed alkoxysilane in the organic liquid described previously. Arylcyclobutenes contain an aryl moiety to which one or more cyclobutene rings are fused. Examples of suitable aryl moieties include benzene, naphthalene, phenanthrene, anthracene, pyridine, a biaryl moiety, or 2 or more aromatic moieties bridged by alkylene or cycloalkylene moieties. Preferred aryl moieties are benzene, naphthalene, biphenyl, binaphthyl, diphenyl alkane or diphenyl cycloalkane moieties. The more preferred aryl moiety is a benzene moiety.

Arylcyclobutenes and methods of making are well known in the art and are exemplified in U.S. Pat. No. 4,540,763 by Kirchoff, which is incorporated herein by reference.

Preferred arylcyclobutenes correspond to the formula:

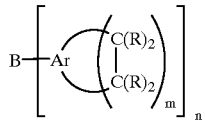

II wherein B is a direct bond or bridging member which comprises (1) a polyvalent inorganic radical, or (2) a polyvalent organic moiety which can contain (a) one or more heteroatoms comprising oxygen, sulfur, nitrogen, or phosphorus, or (b) one or more aromatic moieties; Ar is an aromatic radical which may be substituted; R is separately in each occurrence hydrogen or an electron-withdrawing or electron-donating substituent; m is an integer of 1 or 2 and n is an integer from 1 to 5, with the proviso that B can only be a direct bond wherein n is 2.

In a more preferred embodiment, the arylcyclobutene is benzocyclobutene (the aromatic moiety is benzene and m is 1). Preferred benzocyclobutenes correspond to the formula:

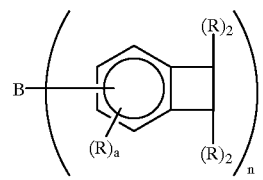

III wherein a is separately in each occurrence the integer 0, 1, 2 or 3; and B, R, and n are as defined hereinbefore. These materials are further defined and taught in U.S. Pat. No. 4,642,329 which is incorporated herein by reference.

Additional compounds corresponding to Formula II wherein B contains Si are further defined and taught in U.S. Pat. No. 4,999,449 which is incorporated herein by reference.

Other U.S. Patents which disclose exemplary benzocyclobutene resins include Pat. Nos. 4,540,763; 4,687,823; 4,730,030; 4,759,874; 4,783,514; 4,812,588; 4,826,997; 4,973,636; and 5,025,080, as well as WO 9312055.

Mixtures of two or more different arylcyclobutenes can also be employed. In addition, the composition can contain other monomers copolymerizable with the arylcyclobutene such as ethylenically unsaturated monomers, e.g.,styrenes, acrylates, divinylbenzene, and methacrylates, acetylenic monomers, e.g., phenyl acetylene and diphenyl acetylene, and other monomers capable of addition polymerization with the arylcyclobutene.

The arylcyclobutene can be used in the form of a monomer, an oligomer, a polymerized or copolymerized resin, a prepolymer, i.e., a partially polymerized or copolymerized arylcyclobutene having reactive polymerization sites which provide for further polymerization, or a combination thereof.

The coating compositions may also contain other additives to impart other useful properties to the film forming compositions. Such additives include but are not limited to photocrosslinking agents, energy transfer agents (exemplified in WO 9312055), anti-oxidants (exemplified in U.S. Pat. No. 5,185,391) and the like.

The amounts of the alkoxysilane solvent and arylcyclobutene employed in the coating composition is dependent upon a number of factors including the specific end-use application and the properties desired. One such application is an adhesion promoter primer coating. As mentioned, a promoter primer coating provides adhesive bonding between the surface to which it is applied and a subsequently applied coating layer. Alternatively, the composition is a self-priming coating. In such a case, the hydrolyzed alkoxysilane functions to provide adhesive bonding between the surface to which self priming formulation is applied and the resultant arylcyclobutene film. In addition, it can also provide adhesive bonding to a subsequently applied surface. In general, a primer composition normally will contain lesser amounts of the arylcyclobutene than when the composition is used as a self-priming composition.

In general, regardless of its intended end-use, the composition comprises from about 0.01 to about 10 weight percent hydrolyzed alkoxysilane, from about 10 to about 99.9 weight percent solvent, and from about 0.01 to about 90 weight percent arylcyclobutene, said weight percents being based on the total weight of the composition.

In general, when applied as an adhesion promoter primer coating application, the composition comprises from about 0.01, more preferably from about 0.2, most preferably from about 1.5 weight percent, to about 10, more preferably about 5, and most preferably to about 2.5 weight percent of hydrolyzed alkoxysilane; from about 75, more preferably about 90, and most preferably about 92.5 weight percent to about 99.9, more preferably about 99.5, and most preferably about 98 weight percent of solvent, and from about 0.01, more preferably from about 1, and most preferably from about 2 weight percent to about 20, more preferably about 10, and most preferably about 5 weight percent of arylcyclobutene, said weight percents being based on the total weight of the composition.

Alternatively, when employed as a self-priming coating application the composition comprises from about 0.01, more preferably from about 0.2, and most preferably from about 0.5 weight percent to about 5, more preferably to about 3, and most preferably to about 1 weight percent of hydrolyzed alkoxysilane; from about 10, more preferably from about 40, and most preferably from about 55 weight percent to about 95, more preferably to about 90 and most preferably to about 80 weight percent of solvent; and from about 5, more preferably from about 10, and most preferably from about 20 weight percent to about 90, more preferably to about 80, and most preferably to about 65 weight percent of arylcyclobutene, said weight percents being based on the total weight of the composition.

In coating articles for use in electronics applications such as multichip modules, flat panel displays, integrated circuits, and the like, representative substrates which can be coated with the coating composition include metals such as aluminum, copper, titanium and chrome; ceramics such as alumina, silica, MgO, BeO, including spinels, aluminum nitride, boron nitride, silicon nitride, gallium arsenide; and glasses such as fiber glass, lime glass, flint glass, borosilicate glass, Pyrex and Vycor. Preferably, if the substrate is a metal such as copper, it is treated with an etchant such as 1 percent acetic acid prior to application of the coating composition. Substrates commonly used in high density electronic circuitry, such as silicon, thermally oxidized silicon, GaAs, alumina and aluminum are commonly treated by processes such as oxygen plasma etching or RCA clean, to control surface chemistry.

While the coating compositions can be applied using any of the techniques well known in the art, such as spray, brush, dip, miniscous, extrusion, capillary, curtain, roll coating and the like, they are typically advantageously applied at room temperature using conventional spin-coating techniques.

In this application, the coating composition can be used as an adhesion promoter primer layer or as a self-priming BCB polymer layer. Typical thicknesses for adhesion promoter primer layers are between about 100 to about 1000 Angstroms, whereas the thickness of the self-priming polymer layer can vary from about 0.5 to about 25 microns. Multiple layers may be prepared using the composition either as an adhesion promoter primer or a self-priming polymer layer. The multi-layer coatings typically range between about 10 to about 500 microns and are preferably from about 50 to about 200 microns. The coating compositions of the present invention may also be subsequently coated with other polymeric materials such as other arylcyclobutene polymers and copolymers or any other polymeric material which will bond with the coating composition.

After being applied, the coating compositions can be crosslinked, photocrosslinked, cured or soft cured. Photodefineable arylcyclobutenes are typically photocrosslinked prior to further cure. Conventional curing techniques such as electron beam, ultra violet, thermal radiation, or convection can also be employed.

The degree of polymerization will depend upon the application involved. For instance, when additional layers will be applied, a soft cure or crosslinking of about 80 to 85 percent (as measured by FTIR) is preferred and can be accomplished, for example, by heating at about 220° C. for about 30 minutes. In the final stage of curing, crosslinking of more than about 95 percent can be achieved, for example, by heating at 250° C. for about 1 hour.

The alkoxysilane used in the coating composition of the present invention is preferably prepared using a solventless process in which the alkoxysilane is contacted with a sufficient amount of water to hydrolyze at least one alkoxy group. Optionally, an acidic or basic catalyst is also employed.

The alkoxysilanes used in the process of hydrolysis can be any alkoxysilane which has no groups sufficiently acidic or basic to catalyze the hydrolysis reaction. Preferably, the alkoxysilanes are those which have been described previously in Formula (I), with the proviso that R is not 3-aminoethylamino or 3-amino and R, Y, and Z may only be further substituted with moieties which are substantially inert or nonreactive in the hydrolysis reaction. Examples of such inert substituents include but are not limited to halogens, alkyl, and aryl groups. More preferably, the alkoxysilane is a trialkoxysilane and is most preferably 3-methacryloxypropyltrimethoxysilane.

The amount of water most advantageously employed in the hydrolysis reaction is dependent upon a variety of factors including the degree of hydrolysis desired. To achieve complete hydrolysis, a stoichiometric amount of water to completely hydrolyze the alkoxysilane is 1 molar equivalent of water for each molar equivalent of alkoxy group present on the alkoxysilane. In practice, less than a stoichiometric amount of water is required for complete hydrolysis since water is formed by condensation reactions during the hydrolysis. The amount of water used for desired hydrolysis in the present invention is preferably no more than a stoichiometric amount. Preferably from about 10 percent to about 80 percent of the stoichiometric amount of water needed for total hydrolysis is used, more preferably from about 30 percent to about 60 percent and most preferably about 40 percent.

The water used in the hydrolysis should be purified. Preferably, the water is deionized and microfiltered.

The optional, but generally preferred, acidic or basic catalysts may be any acidic or basic compound which will catalyze the hydrolysis of the alkoxysilane. Examples of acidic catalysts include but are not limited to hydrochloric acid, sulfuric acid, trifluoroacetic acid, chloroacetic acid, methane sulfonic acid, and phosphoric acid. Examples of basic catalysts include but are not limited to potassium hydroxide, sodium hydroxide, and 3-aminopropyltrialkoxysilanes. More advantageously, the catalyst is acidic. Preferably, the acidic catalyst is hydrochloric acid, sulfuric acid, trifluoroacetic acid, methane sulfonic acid, or phosphoric acid. More preferably, the catalyst is hydrochloric acid, sulfuric acid, trifluoroacetic acid, or phosphoric acid, and most preferably hydrochloric acid.

The catalyst is used in amounts sufficient to catalyze the hydrolysis reaction. The amount of catalyst most advantageously employed will depend upon a number of factors including the desired rate of hydrolysis, the catalyst, the alkoxysilane used, and the degree of hydrolysis desired. Preferably, the catalyst is present in amounts from about 0 ppm to about 50 ppm based on the amount of hydrolyzed alkoxysilane. More preferably, the catalyst is present in amounts from about 2 ppm to about 40 ppm and most preferably between about 4 ppm to about 30 ppm, based on the amount of hydrolyzed alkoxysilane.

Hydrolysis of alkoxysilanes produces a mixture of nonhydrolyzed, partially hydrolyzed, fully hydrolyzed and oligomerized alkoxysilanes. Oligomerization occurs when a hydrolyzed or partially hydrolyzed alkoxysilane reacts with another alkoxysilane to produce water and an Si—O—Si bond. As used herein, the term "hydrolyzed alkoxysilane" encompasses any level of hydrolysis, partial or full, as well as oligomerized.

In hydrolyzing the alkoxysilane, the alkoxysilane, water, and optional catalyst are mixed until the desired hydrolysis is complete. While the time to complete hydrolysis will vary depending on a number of factors, including the specific reactants employed, in general, hydrolysis is complete in a time from about 2 minutes to about 5 hours, preferably for about 4 minutes to about 2 hours, and more preferably for about 10 minutes to about 1 hour.

In general, the alkoxysilane, water, and catalyst initially form a two-phase mixture which upon agitation and continuation of the hydrolysis reaction, becomes a single phase. The time required to form a single phase is dependent upon the alkoxysilane used and the temperature at which the ingredients are mixed; with less time being required at higher temperatures. Depending upon the catalyst type, its concentration and the alkoxysilane used, hydrolysis may be complete by the time a single phase is obtained, or additional time may be required to complete hydrolysis. In general, the mixture is agitated for about 10 minutes to about 2 hours after a single phase is obtained to complete the hydrolysis reaction. The temperature at which hydrolysis is conducted is preferably from about 15° C. to about 100° C., more preferably from about 20° C. to about 50° C. and most preferably from about 20° C. to about 25° C.

Alternatively, the hydrolysis may be conducted in the absence of a catalyst. In this procedure, the alkoxysilane is mixed with water and stirred for a sufficient period of time for the desired extent of hydrolysis to occur. This method may take up to several days dependent upon the alkoxysilane and the temperature at which hydrolysis occurs. In some applications this method may be preferred when residual catalyst levels have an adverse effect on subsequent use of the alkoxysilane.

The following examples are set forth to illustrate the present invention and should not be construed to limit its scope. In the examples, all parts and percentages are by weight unless otherwise indicated.

EXAMPLE 1

12.5 g (0.0503 mol) of 3-Methacryloxypropyltrimethoxysilane (MOPS) containing 29 ppm HCl, and 1.09 g (0.0604 mol) deionized and microfiltered water (pH 6.8) (40 percent of theoretical needed for complete hydrolysis) is combined in a 2 oz. bottle. The two-phase mixture is agitated at 23° C. Hydrolysis proceeds and a single phase is produced in 8 minutes. Proton NMR (DCC13; by measuring methanol by-product formation) indicates that hydrolysis is complete in an additional 8 to 15 minutes. At 15, 30, and 60 minute reaction times, 1.0 g samples are removed and diluted with 39.0 g methanol to give solutions at 2.5 weight percent solids.

Approximately 10 mLs of the solution are dispensed with a syringe through a 0.5 mm filter onto oxidized silicon wafers rotating at 3000 RPM. The morphology of the resulting residue is observed with optical microscopy. CYCLOTENE™ 3022 resin, (a formulation manufactured by The Dow Chemical Company of tetramethyldivinylsiloxane bisbenzocyclobutene resin in mesitylene containing 4.0 weight percent (based on solids) AgeRite™ MA antioxidant (manufactured by B. F. Goodrich)) is subsequently applied at a thickness of 10 microns, and cured at 250° C. for one hour. Delamination of the cured coatings is evaluated by microindentation (as described in *The Determination of Bond Strength of Polymeric Films by Indentation Debonding* by H. D. Conway and J. P. R. Thomsin, in J. Adhesion Sci. Technol. 3, 227, 1988). Values of bond strength are obtained from the level of delamination observed by optical microscopy.

The effects of water level and reaction time on adhesion performance of methanol-based hydrolyzed MOPS adhesion promoters were observed. After application of the adhesion promoter, the morphology of the deposited residue was discontinuous, appearing in the form of droplets.

In a similar fashion, adhesion promoter samples are prepared based on water levels which corresponded to 20, 60, 80, and 100 percent hydrolysis. Results are given in Table I.

TABLE 1

| Water (%) | Reaction Time (min) | Morphology | Adhesion (MPa) |
|---|---|---|---|
| 20 | 15 | droplets | 187 ± 3.9 |
| 20 | 30 | droplets | 172 ± 11.6 |
| 20 | 60 | droplets | 171 ± 3.1 |
| 40 | 15 | droplets | 187 ± 7.7 |
| 40 | 30 | droplets | 192 ± 2.4 |
| 40 | 60 | droplets | 191 ± 7.7 |
| 60 | 15 | droplets | — |
| 60 | 30 | droplets | 178 ± 8.2 |
| 60 | 60 | droplets | 152 ± 8.7 |
| 80 | 15 | droplets | 172 ± 3.8 |
| 80 | 30 | droplets | 162 ± 12.9 |
| 80 | 60 | droplets | 141 ± 9.7 |
| 100 | 15 | droplets | 126 ± 3.9 |
| 100 | 30 | droplets | 118 ± 3.7 |
| 100 | 60 | droplets | 124 ± 3.7 |
| No promoter | | No promoter | 73 ± 4.8 |

EXAMPLE 2

A partially hydrolyzed MOPS is prepared using the same techniques used in Example 1 (40 percent water). After 1 hour reaction time at ambient temperature, portions of the neat hydrolyzed alkoxysilane are added to 5 percent solutions of Cyclotene™ 3022 in mesitylene to yield a series of adhesion promoter solutions in amounts to give solutions containing 0.5, 1.0, 2.5, and 5.0 percent of the hydrolyzed alkoxysilane. Each solution is evaluated for processability and adhesion performance (microindentation). Results are given in Table II.

TABLE II

| Hydrolyzed MOPS Concentration (wt %) | Film-Forming Ability | Adhesion (MPa) |
|---|---|---|
| 0.5 | film-forming | 206 ± 4.0 |
| 1.0 | film-forming | 183 ± 8.1 |
| 2.5 | film-forming | 184 ± 6.6 |
| 5.0 | film-forming | 198 ± 3.0 |
| 2.5% in isopropanol | droplets | 195 ± 6.2 |
| 2.5% in methanol | droplets | 204 ± 6.5 |

Hydrolyzed MOPS adhesion promoter formulations containing CYCLOTENE™ 3022 in mesitylene provide film forming compositions with good adhesion performance.

EXAMPLE 3

A partially hydrolyzed MOPS is prepared using the same conditions used in Example 1 (40 percent water). After 1 hour reaction time at 23° C., portions of the neat partially hydrolyzed MOPS are added to 63 percent solutions of Cyclotene™ 3022 in mesitylene to yield a self-priming formulation with 0.5 weight percent of the hydrolyzed MOPS. This solution is compared to the unprimed solution for stability, processability, and adhesion performance (microindentation) (Comparative Example A). Results are given in Table III.

TABLE III

| Hydrolyzed MOPS Concentration (wt %) | Film Thickness (μm) | Adhesion (MPa) |
|---|---|---|
| 0.5 | 12.87 | 253 ± 10.0 |
| 0.5 | 13.37 | 251 ± 3 |
| 0.5 | 13.24 | 255 ± 1.6 |
| 0.5 | 13.09 | 251 ± 3.5 |
| Comparative Example A | | |
| 0 | 13.09 | 106 ± 5.1 |
| 0 | 13.08 | 97 ± 3.9 |

A self-priming CYCLOTENE™ 3022 formulation containing hydrolyzed MOPS adhesion promoter has considerably improved adhesion performance.

EXAMPLE 4

A partially hydrolyzed MOPS is prepared using the same conditions used in Example 1 (40 percent water). After 1 hour reaction time at ambient temperature, 0.084 g portions of the neat hydrolyzed MOPS are added to the following photosensitive BCB formulation:

14.93 g 1,3-bis(2-bicyclo(4.2.0)octa-1,3,5-trien-3-ylethenyl)-1,1,3,3-tetramethyl disiloxane resin 0.31 g 2,6-bis(4-azidobenzylidene)-4-methylcyclohexanone 0.116 g 4,4'-diazidophenyl sulfone 0.116 g 1,2-dihydro-2,2,4-trimethylquinoline 17.3 g mesitylene The adhesion promoter and photosensitive BCB solution were shaken and allowed to stand until bubbles from the agitation were gone. This produces a self-priming photosensitive formulation with 0.5 percent of the hydrolyzed MOPS coupling agent. This solution is compared to the unprimed solution for stability, processability, and adhesion performance (microindention) (Comparative Example B). Results are given in Table IV.

TABLE IV

| Hydrolyzed MOPS Concentration (wt %) | Film Thickness (μm) | Adhesion (MPa) |
|---|---|---|
| 0.5 | 11.91 | 291 ± 9.0 |
| 0.5 | 11.96 | 289 ± 4.7 |
| Comparative Example B | | |
| 0 | 11.71 | 98 ± 3.3 |
| 0 | 11.84 | 101 ± 1.6 |

Self-priming photodefinable benzocyclobutene formulations containing hydrolyzed MOPS adhesion promoter provide substantial adhesion enhancement.

EXAMPLE 5

12.5 g (0.0503 mol) of 3-Methacryloxypropyltrimethoxysilane (MOPS), 1.09 g (0.0604 mol) of 0.01 N aqueous HCl and 40 percent of the theoretical amount of deionized and microfiltered water (pH 6.8) needed for total hydrolysis are combined in a 2 oz. bottle. This acid level represents 30 ppm HCl in the hydrolyzed MOPS. The two-phase mixture is stirred at ambient temperature (23° C.). Hydrolysis proceeds such that a single phase is produced in 8 minutes. In the absence of the 30 ppm HCl, the mixture does not clear to one phase (little or no reaction) even after 48 hours.

The experiment is repeated using 0.0050 N (15 ppm HCl) and 0.0025 N HCl (7.5 ppm HCl) and 0.0100, 0.0050, and 0.0025 N $H_2SO_4$. Results are given in Table V.

TABLE V

| Acid Concentration | Time to Form Single Phase (min) | |
|---|---|---|
| (N) | HCl | $H_2SO_4$ |
| 0.0100 | 8 | 8 |
| 0.0050 | 14 | 20 |
| 0.0025 | 44 | 75 |

The experiment is repeated to define the hydrolysis temperature, HCl catalyst level, time required to form a single phase and time required for complete hydrolysis (40 percent of theoretical). Proton NMR is used to measure time for complete hydrolysis; single phase times are observed visually. Results are given in Table VI.

TABLE VI

| HCl conc. (ppm) | Reaction Temp. (°C.) | Single Phase (min.) | Complete Hydrolysis (min.) |
|---|---|---|---|
| 0 | 23 | 4320 | 8640 |
| 0 | 40 | 1140 | 2460 |
| 6 | 23 | 40 | 60 |
| 15 | 23 | 15 | 60 |
| 30 | 23 | 8 | 40 |
| 30 | 30 | 5 | 30 |
| 30 | 35 | 4 | 20 |

The single phase and complete hydrolysis columns refer to the amount of time required to reach these conditions.

Although hydrolysis will occur in the absence of HCl, the reaction time is significantly shortened by the presence of trace amounts of HCl. The reaction temperature also greatly effects the time needed for the hydrolysis reaction, wherein higher temperatures decrease the amount of time significantly.

EXAMPLE 6

12.5 g (0.0565 mol) of 3-Aminopropyltriethoxysilane (3-APS) and 1.22 g (0.0678 mol) deionized and microfiltered water (pH 6.8; 40 percent of theoretical needed for total hydrolysis) are combined in a 2 oz. bottle. The two-phase mixture is stirred magnetically at ambient temperature (23° C.). Hydrolysis proceeds such that a single phase is produced in about 60 minutes. Proton NMR (DMSO-$d_6$; by following ethanol formation) indicates that hydrolysis is essentially complete at 60 minutes. This material is used to make a self-priming formulation similar to that of Example 3.

EXAMPLE 7

11.87 g (0.0478 mol) of 3-Methacryloxypropyltrimethoxysilane (MOPS), 0.56 g (0.00251 mol) of 3-aminopropyltriethoxysilane (3-APS); (MOPS/3-APS=95/5 mol ratio) and 1.08 g (0.0604 mol) of deionized and microfiltered water (pH 6.8; 40 percent of theoretical needed for total hydrolysis) are combined in a 2 oz. bottle. The two-phase mixture is stirred at ambient temperature (23° C.). Hydrolysis proceeds such that a single phase is produced in 25 minutes. Proton NMR (DMSO-$d_6$; by following ethanol formulation) indicates that hydrolysis is essentially complete at 30 minutes.

EXAMPLE 8

10.0 g (0.0657 mol) Vinyltrimethoxysilane and 1.46 g (0.0811 mol) aqueous 0.01 N HCl, and 40 percent of the theoretical amount needed for total hydrolysis of deionized and microfiltered water (pH 6.8); are combined in a 2 oz. bottle. The two-phase mixture is stirred at ambient temperature (23° C.). Hydrolysis proceeds such that a single phase is produced in 1 minute. Proton NMR ($DCCl_3$) indicates that hydrolysis is essentially complete in 20 minutes.

A film forming formulation is prepared as in Example 2 using 2.5 percent of the 40 percent hydrolyzed vinyltrimethoxysilane, 5.0 percent Cyclotene™ 3022, and 92.5 percent of mesitylene. The solution is evaluated for processability and adhesion performance by microindentation as in Example 2.

The formulation is film forming and adhesion is 244 MPa.

EXAMPLE 9

10.0 g (0.0616 mol) of Allyltrimethoxysilane, 1.33 g (0.0739 mol) aqueous 0.01 N HCl and 40 percent of the theoretical amount needed for total hydrolysis of deionized and microfiltered water (pH 6.8); are combined in a 2 oz. bottle. The two-phase mixture is stirred at ambient temperature (23° C.). Hydrolysis proceeds such that a single phase is produced in 3 minutes. Proton NMR ($DCCl_3$) indicates that hydrolysis is essentially complete in 60 minutes.

A film forming adhesion promoter formulation is prepared as in Example 8 using 2.5 weight percent of the 40 percent hydrolyzed allyltrimethoxysilane, 5.0 weight percent Cyclotene™ 3022, and 92.5 weight percent of mesitylene. The solution is evaluated for processability and adhesion performance by microindentation as in Example 2.

The formulation is film forming and the adhesion is 147 MPa.

EXAMPLE 10

The following formulation is made to hydrolyze the methyl esters on 3-methacryloxypropyltrimethoxysilane (MOPS):

48.06 g MOPS
48.06 g Methanol
4.81 g Water
0.96 g Trifluoroacetic Acid

The formulation is allowed to stand at room temperature for 24 hours then filtered through Strong Base Resin Ion Exchange Beads to remove the trifluoroacetic acid. 90.35 g of methanol is added during the filtration to rinse the solution from the beads completely. This material is placed in a vacuum evaporation flask in a warm water bath and the methanol is removed to leave the residual hydrolyzed MOPS. The hydrolyzed MOPS is added at 0.5 weight percent relative to solids to a 63 percent solids formulation of Cyclotene™ 3022 in mesitylene. The resultant self-primed solution is deposited by spin-coating onto a thermally oxidized silicon wafer to a thickness of 12.4 µm. The adhesion is measured by microindentation and measures 160.5 MPa±4.2 MPa. This value is an improvement when compared with typical values of 70 MPa obtained with non-primed resin.

What is claimed is:

1. A solventless process for hydrolyzing an alkoxysilane of the formula:

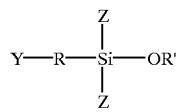

wherein R is $C_1$–$C_6$ alkylidene, $C_1$–$C_6$ alkylene, arylene, or a direct bond; Y is $C_1$–$C_6$ alkyl, $C_2$–$C_6$ alkenyl, aryl, 3-methacryloxy, or 3-acryloxy,; R' is independently in each occurrence $C_1$–$C_6$ alkyl; and Z is $C_1$–$C_6$ alkyl, $C_2$–$C_6$ alkenyl or OR', comprising adding not more than a stoichiometric amount of water, sufficient to hydrolyze at least one of the alkoxy groups, in the presence of an acidic or basic catalyst.

2. The process of claim 1 wherein the alkoxysilane is 3-methacryloxypropyltrialkoxysilane.

3. The process of claim 1 wherein the catalyst is an acidic catalyst.

4. The process of claim 3 wherein the catalyst is selected from the group consisting of hydrochloric acid, sulfuric acid, methanesulfonic acid and phosphoric acid.

5. The process of claim 4 wherein the catalyst is hydrochloric acid.

6. The process of claim 1 wherein the catalyst is a basic catalyst.

* * * * *